US011930445B2

(12) United States Patent
Feng et al.

(10) Patent No.: US 11,930,445 B2
(45) Date of Patent: Mar. 12, 2024

(54) SINGLE-CARRIER QUADRATURE AMPLITUDE MODULATION (SC-QAM) DOWNSTREAM CHANNEL FAST PRE-SCANNING

(71) Applicant: ARRIS Enterprises LLC, Suwanee, GA (US)

(72) Inventors: Xing Feng, Shenzhen (CN); Jinji Guo, Shenzhen (CN); Pingbo Liu, Guangdong (CN); Feng Li, Guangdong (CN)

(73) Assignee: ARRIS ENTERPRISES LLC, Horsham, PA (US)

( * ) Notice: Subject to any disclaimer, the term of this patent is extended or adjusted under 35 U.S.C. 154(b) by 263 days.

(21) Appl. No.: 17/434,852

(22) PCT Filed: Sep. 18, 2020

(86) PCT No.: PCT/CN2020/116323
§ 371 (c)(1),
(2) Date: Aug. 30, 2021

(87) PCT Pub. No.: WO2022/056883
PCT Pub. Date: Mar. 24, 2022

(65) Prior Publication Data
US 2022/0312302 A1  Sep. 29, 2022

(51) Int. Cl.
*H04W 48/16* (2009.01)
*H04L 12/28* (2006.01)

(52) U.S. Cl.
CPC ......... *H04W 48/16* (2013.01); *H04L 12/2801* (2013.01)

(58) Field of Classification Search
CPC ............. H04W 48/16; H04L 27/2685; H04L 2025/03414; H04L 1/0045; H04L 12/2801
(Continued)

(56) References Cited

U.S. PATENT DOCUMENTS

2004/0219926 A1*  11/2004  Kim ................ H04W 36/0088
                                                  455/452.2
2005/0076385 A1  4/2005  Li et al.
2020/0252352 A1  8/2020  Chen

FOREIGN PATENT DOCUMENTS

CN          110234152         9/2019

OTHER PUBLICATIONS

International Search Report and Written Opinion of the International Searching Authority dated Jun. 17, 2021, in International (PCT) Application No. PCT/CN2020/116323.

* cited by examiner

*Primary Examiner* — Leila Malek
(74) *Attorney, Agent, or Firm* — Wenderoth, Lind & Ponack, L.L.P.

(57) ABSTRACT

A network device for providing single-carrier quadrature amplitude modulation (SC-QAM) downstream channel fast pre-scanning. An orthogonal frequency-division multiplexing (OFDM) downstream (DS) channel scan in a foreground process and a single-carrier quadrature amplitude modulation (SC-QAM) DS channel scan in a background process are simultaneously performed. When a first OFDM downstream channel is locked onto, OFDM downstream channel is paused while scanning for SC-QAM downstream channels continues. SC-QAM DS channels identified in the background process are stored in a table. Based on a scan of all OFDM channels and failure to lock onto any OFDM DS channels, the SC-QAM DS channel scan in the background process is stopped and a normal SC-QAM DS channel scan is started. SC-QAM DS channels in the table are scanned first to provide fast pre-scanning. A modem becomes operational with a qualified SC-QAM DS channel obtained from the table.

18 Claims, 4 Drawing Sheets

(58) Field of Classification Search
USPC .......................................................... 375/257
See application file for complete search history.

SINGLE-CARRIER QUADRATURE AMPLITUDE MODULATION (SC-QAM) DOWNSTREAM CHANNEL FAST PRE-SCANNING

BACKGROUND

The subject matter of the present disclosure relates to continued background scanning for single-carrier quadrature amplitude modulation (SC-QAM) downstream channels during orthogonal frequency-division multiplexing (OFDM) downstream channel qualifying.

SUMMARY

Aspects of the present disclosure are drawn to continuing to scan for SC-QAM downstream channels in a background process while qualifying OFDM downstream channels and storing qualifying SC-QAM channels in a table for fast identification when OFDM downstream channel qualification fails. A scan for OFDM downstream channels and a scan for single-carrier quadrature amplitude modulation (SC-QAM) downstream channels are performed simultaneously. When a first OFDM downstream channel is locked onto, OFDM downstream channel is paused while scanning for SC-QAM downstream channels continues. The scanning for SC-QAM downstream channels is performed in a background process. One or more operational frequencies of SC-QAM downstream channels are identified. The operational frequencies are SC-QAM channels having QAM and forward error correction (FEC) coding. The one or more identified operational frequencies of SC-QAM downstream channels are stored in a table for fast pre-scanning. When an operational OFDM downstream channel cannot be identified, the table containing the one or more operational frequencies for the SC-QAM downstream channels is scanned The scanning for SC-QAM downstream channels is halted when an operational OFDM downstream channel is identified. The OFDM downstream channel is qualified by performing ranging to tune transmit parameters, switch from data over cable service interface specification (DOCSIS) protocol communication to Internet Protocol layer communication and downloading a configuration file for setting an operation parameter.

The table storing the frequencies for the operational SC-QAM downstream channels is cleared if the network device is reinitialized. Upon identification of one or more operational downstream channels, the operational downstream channels are bonded together to form a virtual downstream channel having a bandwidth equal to a sum of the operational downstream channels bonded together.

BRIEF SUMMARY OF THE DRAWINGS

The accompanying drawings, which are incorporated in and form a part of the specification, illustrate example embodiments and, together with the description, serve to explain the principles of the present disclosure. In the drawings.

While implementations are described herein by way of example, those skilled in the art will recognize that the implementations are not limited to the examples or figures described. It is understood that the figures and detailed description thereto are not intended to limit implementations to the particular form disclosed but, on the contrary, the intention is to cover modifications, equivalents, and alternatives falling within the spirit and scope as defined by the appended claims. The headings used herein are for organizational purposes and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to."

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

The subject matter of the present disclosure provides a network device, such as a cable modem, that does not halt scanning for single-carrier quadrature amplitude modulation (SC-QAM) downstream channels during orthogonal frequency-division multiplexing (OFDM) downstream channel qualifying. A table of frequencies of qualifying SC-QAM downstream channels is generated in a background process. When no valid OFDM downstream channels are found, the table can be quickly searched to identify qualifying SC-QAM downstream channels.

Figure 1:
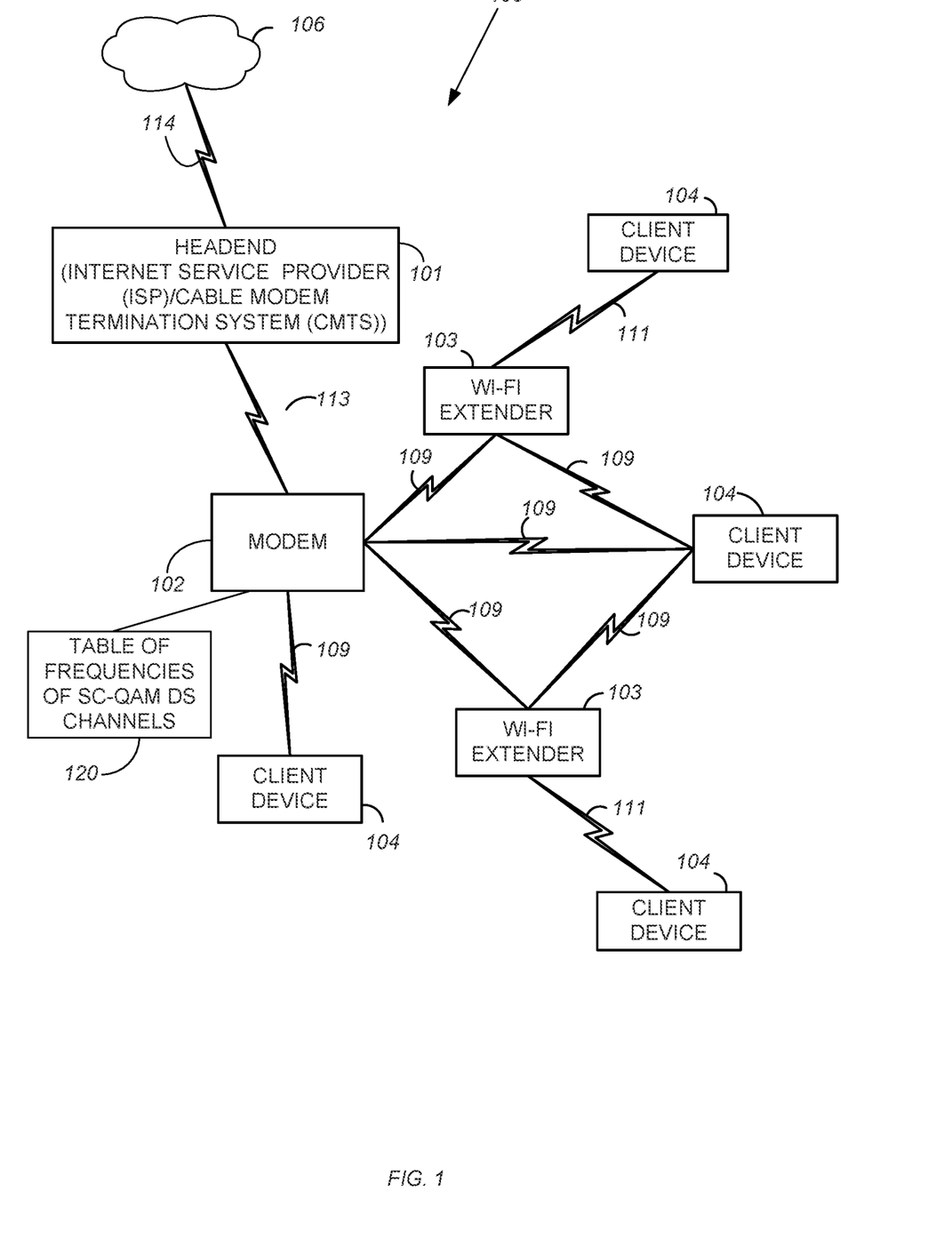
FIG. 1 is a schematic diagram of a system.

FIG. 1 is a schematic diagram of a system 100.

As shown in FIG. 1, the system includes a network device 102 connected to the Internet 106 via an Internet Service Provider (ISP) 101 and also connected to different wireless devices such as wireless extenders 103 and client devices 104. The system shown in FIG. 1 includes wireless devices (e.g., wireless extenders 103 and client devices 104) that may be connected in one or more wireless networks (e.g., private, guest, iControl, backhaul network, or Internet of things (IoT) network) within the system. Additionally, there could be some overlap between wireless devices (e.g., wireless extenders 103 and client devices 104) in the different networks. That is, one or more network devices could be located in more than one network. For example, the wireless extenders 103 could be located both in a private network for providing content and information to a client device 104 and also included in a backhaul network or an iControl network.

Starting from the top of FIG. 1, the ISP 101 can be, for example, a streaming video provider or any computer for connecting the network device 102 to the Internet 106. The connection 114 between the Internet 106 and the ISP 101 and the connection 113 between the ISP 101 and the network device 102 can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example.

The connection 113 can further include as some portion thereof a broadband mobile phone network connection, an optical network connection, or other similar connections. For example, the connection 113 can also be implemented using a fixed wireless connection that operates in accordance with, but is not limited to, 3rd Generation Partnership Project (3GPP) Long Term Evolution (LTE) or 5G protocols. It is also contemplated by the present disclosure that connection 113 is capable of providing connections between the network device 102 and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The network device 102 can be, for example, a hardware electronic device that may be a combination modem and gateway device that combines the functions of a modem, an access point, and/or a router for providing content received from the content provider (e.g., ISP 101) to network devices (e.g., wireless extenders 103 and client devices 104) in the system. It is also contemplated by the present disclosure that the network device 102 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content.

The connections 109 between the network device 102, the wireless extenders 103, and client devices 104 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, or 6 GHz bands. Additionally, the connections 109 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connections 109 can include connections to a media over coax (MoCA) network. One or more of the connections 109 can also be a wired Ethernet connection.

The wireless extenders 103 can be, for example, hardware electronic devices such as access points used to extend the wireless network by receiving the signals transmitted by the network device 102 and rebroadcasting the signals to, for example, client devices 104, which may out of range of the network device 102. The wireless extenders 103 can also receive signals from the client devices 104 and rebroadcast the signals to the network device 102, or other client devices 104.

The connections 111 between the wireless extenders 103 and the client devices 104 are implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands. Additionally, the connection 111 can be implemented using a wireless connection that operates in accordance with, but is not limited to, RF4CE protocol, ZigBee protocol, Z-Wave protocol, or IEEE 802.15.4 protocol. Also, one or more of the connections 111 can be a wired Ethernet connection.

The client devices 104 can be, for example, hand-held computing devices, personal computers, electronic tablets, smart phones, smart speakers, IoT devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the network device 102. Additionally, the client devices 104 can be a TV, an IP/QAM STB or an SMD that is capable of decoding audio/video content and playing over OTT or MSO provided content received through the network device 102.

The connection 109 between the network device 102 and the client device 104 is implemented through a wireless connection that operates in accordance with, but is not limited to, any IEEE 802.11 protocols. Additionally, the connection 109 between the network device 102 and the client device 104 can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The connection 109 can also be implemented using a wireless connection in accordance with Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands. One or more of the connections 10 can also be a wired Ethernet connection.

Figure 2:
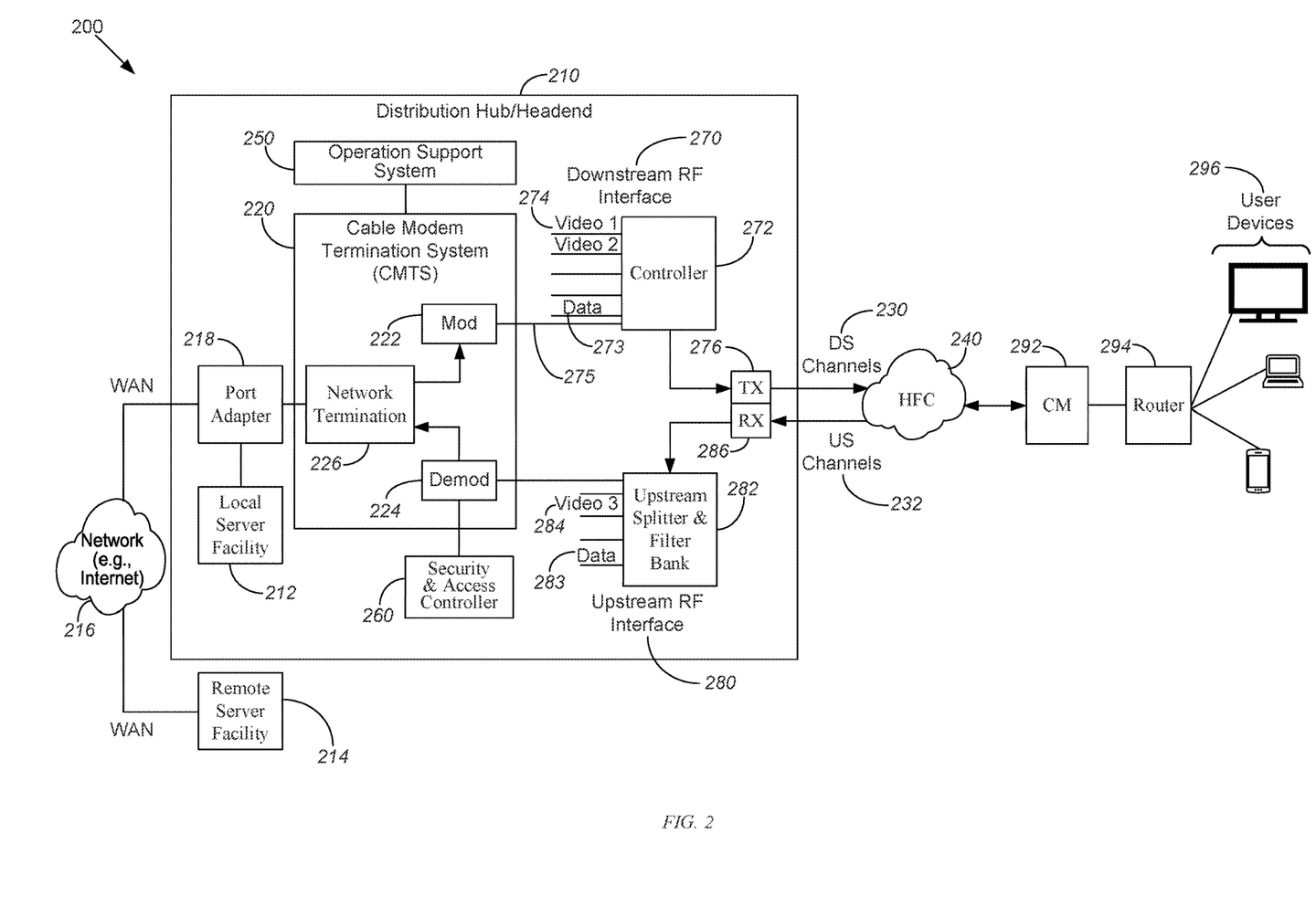
FIG. 2 illustrates a block diagram of a system for providing OFDM and SC-QAM downstream channels.

A detailed description of the exemplary internal components of the network device 102, the wireless extenders 103, and the client devices 104 shown in FIG. 1 will be provided in the discussion of FIG. 2. However, in general, it is contemplated by the present disclosure that the network device 102, the wireless extenders 103, and the client devices 104 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing components in the network device 102, the wireless extenders 103, and the client devices 104 may be adapted to execute any operating system, including Linux, UNIX, Windows, MacOS, DOS, and ChromOS as well as virtual machines adapted to virtualize execution of a particular operating system, including customized and proprietary operating systems. The network device 102, the wireless extenders 103, and the client devices 104 are further equipped with components to facilitate communication with other computing devices over the one or more network connections to local and wide area networks, wireless and wired networks, public and private networks, and any other communication network enabling communication in the system.

Network device 102 scans for SC-QAM downstream (DS) channels from the headend, e.g., CMTS 101, in a background process while still scanning and qualifying OFDM DS channels in a foreground process. When the network device 102 locks onto a first OFDM DS channel, the OFDM DS channel scan is paused while scanning for SC-QAM DS channels continues.

The network device 102 stores SC-QAM DS DS channels identified in the background process in table 120. Network device 102 determines whether an OFDM DS channel has been locked onto. Based on a scan of all OFDM DS channels and failure to lock onto any OFDM DS channels, network device 102 stops the SC-QAM DS channel scan in the background process and initiates a normal SC-QAM DS channel scan. Network device 102 scans the SC-QAM DS channels in table 120 first and then the other SC-QAM DS channels are scanned. The network device 102 becomes operational with an SC-QAM DS channel obtained from table 120.

When the network device 102 locks onto an OFDM DS channel from the OFDM DS channel scan performed in the foreground process, the network device 102 pauses the OFDM DS channel scan in the foreground process and performs qualification of the OFDM DS channel that was locked onto. The network device 102 stops the SC-QAM DS channel scan in the background process based on the OFDM channel passing the qualification process. Network device 102 performs channel bonding and baseline privacy interface (BPI) security and makes the qualified OFDM DS channel operational. Network device 102 qualifies the OFDM DS channel by performing upstream ranging, establishing IP communication, downloading and parsing a configuration file, and registering the OFDM DS channel with a cable modem termination system (CMTS). When the qualification of the OFDM DS channel that was locked onto fails, network device 102 begins the OFDM DS channel scan again in the foreground process. During the SC-QAM DS channel scan in the background process, network device 102 decides whether a SC-QAM DS channel scan passed QFM lock.

FIG. 2 illustrates a block diagram of a system 200 for providing OFDM and SC-QAM downstream channels.

In FIG. 2, a headend/distribution hub 210 is illustrated providing signals to a cable modem 292. Cable modem 292 communicates with router 294. Router 294 provides the data and other content to user devices 296, e.g., TV, computer, mobile devices, etc. The headend assembles content from many sources, such as a local server facility 212 and remote server facility 214 is coupled to the headend through a network 216, such as the Internet, that connects with a port adapter 218. The headend 210 also has the main link funneling data from the cable modem 292 to the Internet 216.

The headend 210 ends the assembled data and video to branch locations around the geographic area to a facility known as a Cable Modem Termination System (CMTS) 220. The CMTS 220 contains the modulators 222 to implement content on downstream (DS) channels 230 and demodulators 224 to process data received on upstream (US) channels 232 from the cable modem 292. The headend 210 supports both the DS and Us signals by using separate frequencies. Network termination 226 provides an interface between network 216 and signal provided by the CMTS 220.

A downstream RF interface 270 includes a controller 272 that receives data 273 and video signals 274. The data 273 and video signals 274 are modulated by the controller based on modulation signals 275 from modulator 222. The controller 272 then provides the signals to a transmitter 276 that then transmits the signals via the HFC network 240.

Optical fibers feed a geographic area. When the fiber reaches a smaller geographic area, such as a neighborhood, an optical signal provided by the optical fibers are converted to electrical signals and split into paths to the cable modems. This combination of optical (fiber) and electrical (coaxial) is called Hybrid Fiber Coax (HFC) network 240. The CMTS 220, which is located at the headend 210, provides the interface to the HFC network 240. The CMTS 220 provides the control functions to arbitrate and schedule transmissions from the many cable modems 292.

A downstream RF interface 270 includes a controller 272 that receives data 273 and video signals 274. The data 273 and video signals 274 are modulated by the controller based on modulation signals 275 from modulator 222. The controller 272 then provides the signals to a transmitter 276 that then transmits the signals via the HFC network 240. An upstream RF interface 280 includes filters and splitter 282 that separate the individual signals received from receiver 286. The received data 283 and video signals 284 are demodulated by demodulator 224.

Management of the system is provided by the operation support system 250 enables management of the system. The operation support system 250 allows the operator to detect problems in the network, and determine the status, capability and provisioning of the parameters for the cable modem 292.

In the data over cable service interface specification (DOCSIS) protocol, the CMTS 220 controls all aspects of managing the bandwidth in both directions on the HFC network 240. This control allows for assigning different levels of priority and bandwidth to each individual cable modem 292. Because of the tight control provided by the CMTS 220, upstream and downstream transmission on the HFC network 240 can be accurately scheduled thus enabling the desired quality of service (QoS) for each type of connection (i.e., Voice, video, and data packets). A security and access controller 260 ensures that only valid users are able to use the system. Security and access controller 260 also provides data encryption so that a user is assured of privacy of their data.

In previous versions of DOCSIS (e.g., DOCSIS 1.x, 2.0 3.0), each downstream channel 230 or upstream channel 232 used a method of encoding digital data called quadrature amplitude modulation (QAM). A QAM channel refers to an analog radio frequency channel that uses quadrature amplitude modulation (QAM), which is a modulation technique in which an analog signal's amplitude and phase vary to convey information, such as digital data. A QAM channel can include single-carrier quadrature amplitude modulation (SC-QAM) that carries only one QAM signal. A cable modem 292 or CMTS 220 implemented according to DOCSIS 3.1 may operate in a SC-QAM operation only mode, or in a simultaneous SC-QAM and OFDM/OFDMA mode With DOCSIS 3.1, orthogonal frequency-division multiplexing (OFDM) refers to a technique that splits the radio signal into smaller, adjacent sub-carriers that are then transmitted simultaneously at different frequencies to the receiver using frequency division multiplexing. In addition the sub-carriers in an OFDM system are overlapping to maximize spectral efficiency.

Figure 3:
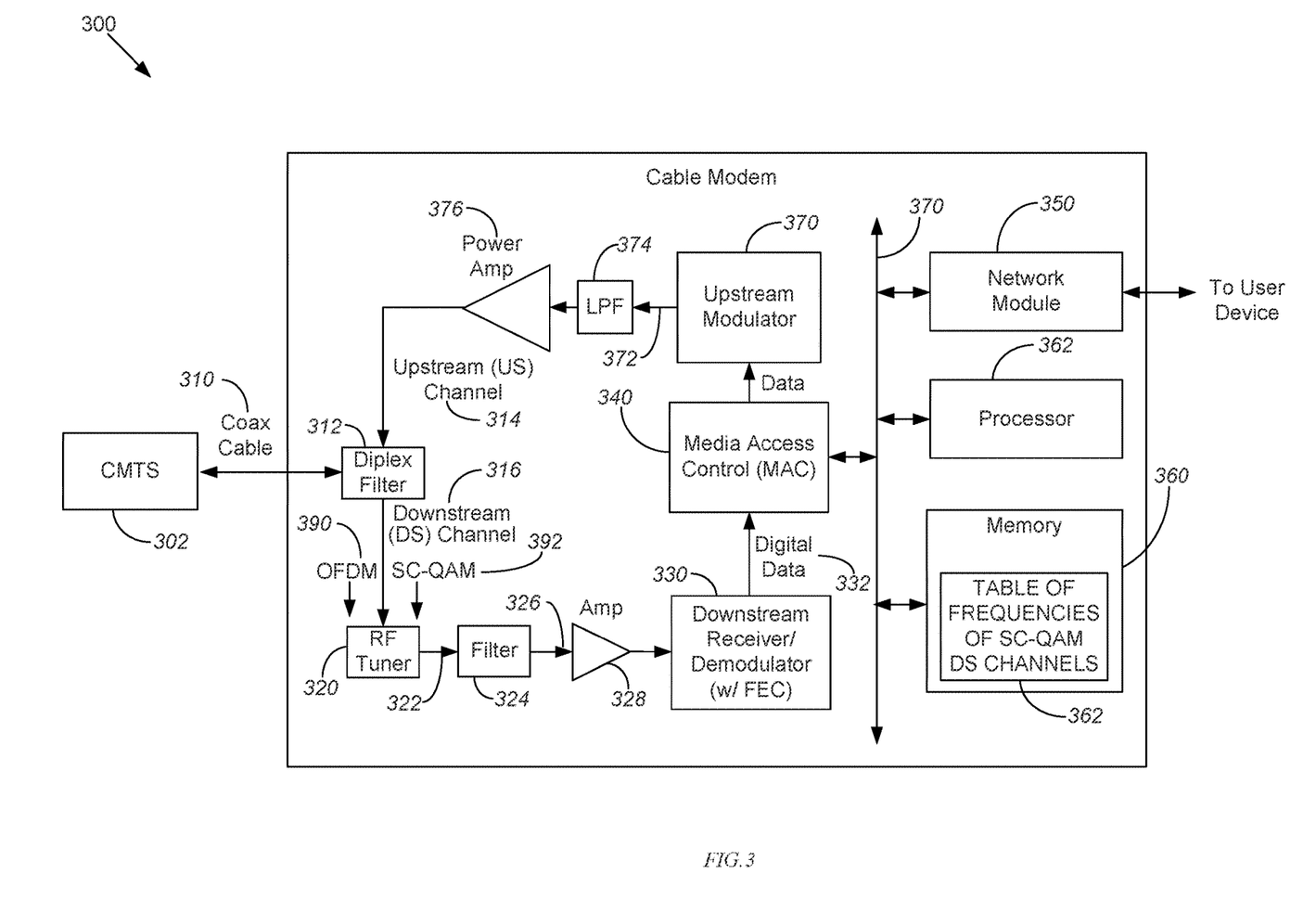
FIG. 3 illustrates a block diagram of a network device.

FIG. 3 illustrates a block diagram of a network device 300.

In FIG. 3, network device 300 may be or include a cable modem. For example, a cable modem may be coupled to a network (not shown) by a cable 310, typically, a coaxial cable. A diplex filter 312 may be used to separate the upstream channel signals 314 and the downstream channel signals 316. An RF tuner 320 receives an incoming signal received from a cable modem termination system (CMTS) 302 on a downstream channel 316 via the cable 310 while an outcoming is directed to the network on an upstream channel 314. The RF tuner 320 converts the RF signal from the downstream channel 316 to IF signals 322 and outputs the IF signals 322 to a filter 324, such as a saw filter, where the signal is filtered and limited to a predetermined bandwidth, e.g., a 6 MHz bandwidth. The filtered signal 326 is passed through an amplifier 328 to a receiver/demodulator 330, where an analog-to-digital (or "A/D") conversion of the signal, followed by a QAM demodulation, Viterbi decoding and forward error correction (FEC) of the filtered signal 326 is performed to produce a digital signal 332. The digital signal 332 is then transmitted to a media access controller (or "MAC") 340 which controls the protocol and administration layer of the cable modem 300. The MAC 340, which may be implemented in either hardware or a combination of hardware and software, assigns frequencies and data rates for upstream transmissions and allocates time slots for upstream transmission. From the MAC 340, data continues on to a network interface 350.

In addition to being part of the downstream path from a CMTS 302, the MAC 340 is also in the upstream path and extends to the upstream channel 314. Digital data received at the network interface 350, or stored in memory 360, may be transferred to MAC 340. From the MAC 340, the digital data is passed on to the modulator 370. There, the digital data is modulated onto a selected frequency and converted into an analog signal 372. From the modulator 370, the analog signal 372 is transmitted to a low pass filter 374, and a power amplifier 376 to produce a signal on the upstream channel 314. The signal on the upstream channel 314 enters the diplex filter 312. The diplex filter 312 directs the signal on the upstream channel 314 onto the cable 310 for transmission to the CMTS 302. The cable modem 300 also includes a processor 362, and memory 360, which may include table 362. The processor 362, network interface 350, and memory 360 are coupled to MAC 340 by a bus 370. The processor 362 controls operation of the cable modem 300, including band selection and tuning, for example, using information residing in the memory 360.

Cable modem 300 scans the downstream channels 316 looking for a physical layer link channel (PLC). Each downstream channel 316 contains a PLC embedded within it. Once the PLC is detected, the receiver/demodulator 330 decodes the PLC to obtain information on the downstream channel 316. Searching for the PLC can be relatively time consuming. A PLC is a signaling sub-channel with information that the cable modem 300 uses to acquire and maintain lock on OFDM downstream signals. PLCs include a timestamp, energy management information, a trigger message for synchronizing an event between the CMTS 302 and the cable modem 300, and a message channel for bringing cable modem 300 online. Without the PLC acquisition, the cable modem 300 cannot decode data from the CMTS 302.

For example, processor 362 of cable modem 300 will read the Timestamp Message Block of the PLC for a DOC SIS timestamp. If the DOCSIS timestamp is found, processor 362 of cable modem 300 will then read the Message Channel Message Block of multiple PLC frames for a valid OCD message that contains channel parameters of the entire OFDM downstream channel 390. If processor 362 of cable modem 300 receives a valid OCD message, processor 362 of cable modem 300 will read the Message Channel Message Block of multiple PLC frames for a valid DPD for profile parameters and for a valid DPD for the Next Codeword Pointer (NCP). When data codewords are mapped to sub-carriers within a symbol, a pointer is needed to identify where a data code words start. The NCP is provided by the CMTS 302 to provide a reference to the appropriate profile and a start pointer for codewords. If both DPD messages are valid, processor 362 of cable modem 300 will attempt to acquire the data for the profile from the OFDM downstream channel 390. If processor 362 of cable modem 300 successfully decodes data from the profile, processor 362 of cable modem 300 will consider the OFDM downstream channel 390 valid. However, processor 362 of cable modem 300 will consider the OFDM downstream channel 390 invalid if the DOCSIS timestamp is not found, the OCD message is not acquired, the profile parameters are not acquired, the NCP parameters are not acquired, or if the profile could not be decoded on the OFDM downstream channel 390.

Previously, when a cable modem 300 locked on an OFDM downstream channel 390, the cable modem 300 will stop scanning for SC-QAM downstream channels 392 and obtain the channel parameters from the PLC of the locked OFDM downstream channel 390. However, the OFDM downstream channel 390 that the cable modem 300 locked onto may not be operational. The cable modem 300 thus begins scanning for OFDM downstream channels 390. If the cable modem 300 locks on another OFDM downstream channel 390, scanning for SC-QAM downstream channels 392 will again stop. If no additional OFDM downstream channels 390 are available, the cable modem 300 will scan for SC-QAM downstream channels 392. However, during this time, a lot of time is wasted when scanning for SC-QAM downstream channels 392 is halted.

Thus, according to aspects of the disclosure, scanning for SC-QAM DS channels 316 is not halted. Processor 362 of cable modem 300 controls RF tuner 320 to simultaneously scan for OFDM DS channels 314 in a foreground process and for SC-QAM DS channels 316 in a background process. Processor 362 of cable modem 300 locks onto a first OFDM DS channel 314, and, while continuing to scan for the SC-QAM DS channels 316, stops scanning for OFDM DS channels 314. Processor 362 of cable modem 300 continues to scan for SC-QAM DS channels 316 in the background process to identify one or more operational frequencies of SC-QAM DS channels 316. Processor 362 stores, in a table in the memory 360, SC-QAM DS DS channels 316 identified in the background process. Processor 362 makes a determination whether an OFDM DS channel 316 that the cable modem 300 has been locked onto.

Based on a scan of all OFDM DS channels and failure to lock onto any OFDM DS channels 316, processor 362 stops the SC-QAM DS channel scan in the background process and initiates a normal SC-QAM DS channel scan. Processor 362 scans the SC-QAM DS channels in table 362 first and then the other SC-QAM DS channels 316 are scanned. Processor 362 becomes operational with an SC-QAM DS channel 316 obtained from table 120.

When processor 362 locks onto an OFDM DS channel 316 from the OFDM DS channel scan performed in the foreground process, the Processor 362 pauses the OFDM DS channel scan in the foreground process and performs qualification of the OFDM DS channel 316 that was locked onto. The processor 362 stops the SC-QAM DS channel scan in the background process based on the OFDM DS channel passing the qualification process. Processor 362 performs channel bonding and baseline privacy interface (BPI) security and makes the qualified OFDM DS channel 316 operational. Processor 362 qualifies the OFDM DS channel by performing upstream ranging, establishing IP communication, downloading and parsing a configuration file, and registering the OFDM DS channel 316 with cable modem termination system (CMTS) 302. When the qualification of the OFDM DS channel that was locked onto fails, Processor 362 begins the OFDM DS channel scan again in the foreground process. During the SC-QAM DS channel scan in the background process, processor 362 decides whether a SC-QAM DS channel scan passed QFM lock.

Figure 4:
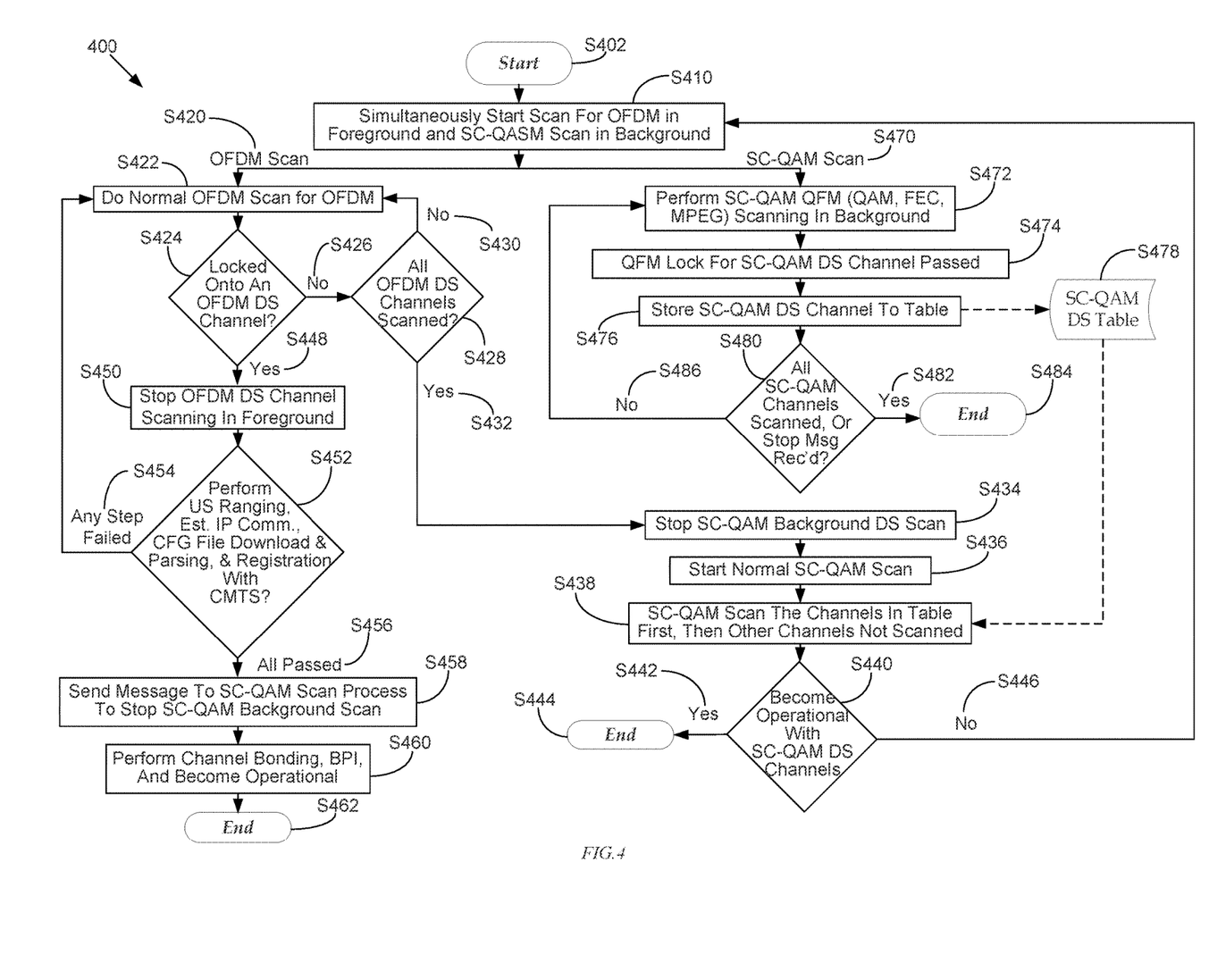
FIG. 4 is a flow chart of a method for performing SC-QAM downstream channel fast pre-scanning.

FIG. 4 is a flow chart of a method 400 for performing SC-QAM downstream channel fast pre-scanning.

In FIG. 4, method 400 starts (S402), and a simultaneously scan for OFDM downstream channels in a foreground process and for SC-QAM downstream channels in a background process is performed (S410). Referring to FIG. 3, processor 362 causes RF tuner 320 to scan for OFDM downstream channels 314 and for SC-QAM downstream channels 316. During the OFDM scan (S420), a normal OFDM DS channel scan is performed (S422). During the OFDM scan (S420), a normal OFDM DS channel scan is performed (S422). Referring to FIG. 3, an RF tuner 320 receives an incoming signal received from a cable modem termination system (CMTS) 302 on a downstream channel 316 via the cable 310 while an upstream channel 314 to the CMTS 302. A determination is made whether an OFDM DS channel is locked onto (S424). Processor 362 processes OFDM DS channels via downstream receiver/demodulator 330. When no OFDM DS channel is locked onto (S426), a determination is made whether all OFDM DS channels have been scanned (S428). If all OFDM DS channels have not been scanned (S430), the OFDM DS channel scan is resumed (S422). Referring to FIG. 3, the RF tuner 320 again tries to lock onto incoming signals received from CMTS 302 on downstream channel 316. If all OFDM DS channels have been scanned (S432), The SC-QAM DS channel scan in the background process is stopped (S434). A normal SC-QAM DS channel scan is initiated (S436). Processor 362 also controls RF tuner 320 to tune to incoming SC-QAM signals received from a cable modem termination system (CMTS) 302 on downstream channel 316 via the cable 310.

SC-QAM DS channels stored in a table are scanned first and then any other SC-QAM DS channels are scanned (S438). Processor 362 accesses table 362 in memory 360 to scan for stored SC-QAM DS channels. A determination is made whether the network device becomes operational with SC-QAM DS channels (S440). Referring to FIG. 3, processor 362 determines whether the SC-QAM DS channels stored in table 362 of memory 360 are operational. If yes (S442), the process ends (S444). If not (S446), the simultaneous scan for OFDM DS channels and SC-QAM DS channels is restarted (S410).

When an OFDM DS channel is locked onto (S448), the OFDM DS channel scan in the foreground process is stopped (S450). Referring to FIG. 3, processor 362 stops the OFDM DS channel scan in the foreground process by not continuing to adjust RF tuner 320 for frequencies of OFDM DS channels. A determination is made whether the an OFDM DS channel that is locked onto passes all qualification steps (S452). The qualification steps include performing US ranging, establishing IP communication, downloading of a configuration file, and parsing and registration with the CMTS. Referring to FIG. 3, processor 362 processes OFDM DS channels that are locked onto that passes through downstream receiver/demodulator 330 and MAC component 340.

If any step fails (S454), the OFDM DS channel scan in the foreground process restarts (S422). The processor 362 begins to adjust RF tuner 320 to frequencies of OFDM DS channels. If all of the qualification steps pass (S456), a message is sent to the SC-QAM DS channel scan process to stop the SC-QAM DS channel scan in the background process (S458). Referring to FIG. 3, processor 362 executes both the SC-QAM DS channel scan and the OFDM DS channel scan. Processor 362 thus passes a message to the SC-QAM DS channel scan process to stop the SC-QAM DS channel scan in the background process. Then, channel bonding and baseline privacy interface (BPI) security are performed, and the qualified OFDM DS channel is made operational (S460). The method then ends (S462).

During the SC-QAM DS channel scan in the background process (S470), SC-QAM QFM is performed in the background (S472). As described above, processor 362 executes both the SC-QAM DS channel scan and the OFDM DS channel scan. QFM Lock for the SC-QAM DS channel passes (S474). SC-QAM DS channels are stored (S476) in SC-QAM DS Table (S478). A determination is made whether all SC-QAM DS channels have been scanned or the stop message from step "S458" has been received (S480). Referring to FIG. 3, processor 362 determines whether all SC-QAM DS channels have been scanned or a stop message has been received. If either all SC-QAM DS channels have been scanned or the stop message from step "S458" has been received (S482), the method ends (S484). If all SC-QAM DS channels have not been scanned and the stop message from step "S458" has not been received (S486), SC-QAM DS channel scanning in the background process continues (S472). Referring to FIG. 3, processor 362 again continues SC-QAM DS channel scanning in the background process.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A modem, comprising:
   a memory storing computer-readable instructions; and
   a processor configured to execute the computer-readable instructions to:
   simultaneously begin an orthogonal frequency-division multiplexing (OFDM) downstream (DS) channel scan in a foreground process and a single-carrier quadrature amplitude modulation (SC-QAM) DS channel scan in a background process;
   store SC-QAM DS channels identified in the background process in a table;
   determine whether an OFDM DS channel has been locked onto;
   stop the SC-QAM DS channel scan in the background process and begin a normal SC-QAM DS channel scan based on a scan of all OFDM DS channels and failure to lock onto any OFDM DS channels;
   scan SC-QAM DS channels in the table; and
   become operational with an SC-QAM DS channel obtained from the table.

2. The modem of claim 1, wherein the processor locks onto an OFDM DS channel from the OFDM DS channel scan performed in the foreground process, stops the OFDM DS channel scan in the foreground process, performs qualification of the OFDM DS channel locked onto to identify a qualified OFDM DS channel, and for the qualified OFDM DS channel performs channel bonding, establishes baseline privacy interface (BPI) security, and makes the qualified OFDM DS channel operational.

3. The modem of claim 2, wherein the processor qualifies the OFDM DS channel by performing upstream ranging, establishing Internet Protocol (IP) communication, downloading and parsing a configuration file, and registering the OFDM DS channel with a cable modem termination system (CMTS).

4. The modem of claim 2, wherein the processor determines the qualification of the OFDM DS channel locked onto fails and begins the OFDM DS channel scan again in the foreground process.

5. The modem of claim 2, wherein the processor stops the SC-QAM DS channel scan in the background process based on the OFDM DS channel passing the qualification of the OFDM DS channel locked onto to identify the qualified OFDM DS channel.

6. The modem of claim 2, wherein the processor stops the SC-QAM DS channel scan based on completing the SC-QAM DS channel scan or receiving a stop message based on an OFDM DS channel passing the qualification of the OFDM DS channel locked onto to identify the qualified OFDM DS channel.

7. A method for identifying operational downstream channels, comprising:
   simultaneously beginning an orthogonal frequency-division multiplexing (OFDM) downstream (DS) channel scan in a foreground process and a single-carrier quadrature amplitude modulation (SC-QAM) DS channel scan in a background process;
   storing SC-QAM DS channels identified in the background process in a table;
   determining no OFDM DS channels locked onto;
   stopping the SC-QAM DS channel scan in the background process and beginning a normal SC-QAM DS channel scan based on a scan of all OFDM DS channels and failure to lock onto any OFDM DS channels;
   scanning SC-QAM DS channels in the table; and
   becoming operational with SC-QAM DS channel obtained from the table.

8. The method of claim 7 further comprising analyzing SC-QAM DS channels to determine operational SC-QAM DS channels in the background process and storing the operational SC-QAM DS channels in the table.

9. The method of claim 7 further comprising locking onto an OFDM DS channel from the OFDM DS channel scan performed in the foreground process, stopping the OFDM DS channel scan in the foreground process, performing qualification of the OFDM DS channel locked onto to identify a qualified OFDM DS channel, and, for the qualified OFDM DS channel, performing channel bonding, establishing baseline privacy interface (BPI) security, and making the qualified OFDM DS channel operational.

10. The method of claim 9, wherein the performing the qualification of the OFDM DS channel further comprises performing upstream ranging, establishing Internet Protocol (IP) communication, downloading and parsing a configuration file, and registering the OFDM DS channel with a cable modem termination system (CMTS).

11. The method of claim 10 further comprising stopping the SC-QAM DS channel scan in the background process based on the OFDM DS channel passing the qualification of the OFDM DS channel locked onto to identify the qualified OFDM DS channel.

12. The method of claim 10 further comprising stopping the SC-QAM DS channel scan based on completing the SC-QAM DS channel scan or based on receiving a stop message based on the OFDM DS channel passing the qualification of the OFDM DS channel locked onto to identify the qualified OFDM DS channel.

13. A non-transitory computer-readable media having computer-readable instructions stored thereon, which when executed by a processor causes the processor to perform operations comprising:
   storing SC-QAM DS channels identified in a background process in a table;
   determining whether an OFDM DS channel has been locked onto;
   stopping the SC-QAM DS channel scan in the background process and beginning a normal SC-QAM DS channel scan based on a scan of all OFDM DS channels and failure to lock onto any OFDM DS channels;
   scanning SC-QAM DS channels in the table; and becoming operational with an SC-QAM DS channel obtained from the table.

14. The non-transitory, computer-readable media of claim 13 further comprising analyzing the SC-QAM DS channels to determine operational SC-QAM DS channels in the background process and storing the operational SC-QAM DS channels in the table.

15. The non-transitory, computer-readable media of claim 13 further comprising locking onto an OFDM DS channel from the OFDM DS channel scan performed in a foreground process, stopping the OFDM DS channel scan in the foreground process, performing qualification of the OFDM DS channel locked onto to identify a qualified OFDM DS channel, and, for the qualified OFDM DS channel, performing channel bonding, establishing baseline privacy interface (BPI) security, and making the qualified OFDM DS channel operational.

16. The non-transitory, computer-readable media of claim 15, wherein the performing the qualification of the OFDM DS channel further comprises performing upstream ranging, establishing Internet Protocol (IP) communication, downloading and parsing a configuration file, and registering the OFDM DS channel with a cable modem termination system (CMTS).

17. The non-transitory, computer-readable media of claim 16 further comprising stopping the SC-QAM DS channel scan in the background process based on the OFDM DS channel passing the qualification of the OFDM DS channel locked onto to identify the qualified OFDM DS channel.

18. The non-transitory, computer-readable media of claim 15 further comprising stopping the SC-QAM DS channel scan based on completing a scan for SC-QAM DS channels or based on receiving a stop message based on the OFDM DS channel passing the qualification of the OFDM DS channel locked onto to identify the qualified OFDM DS channel.

* * * * *